July 5, 1966 R. C. BUELER 3,259,439

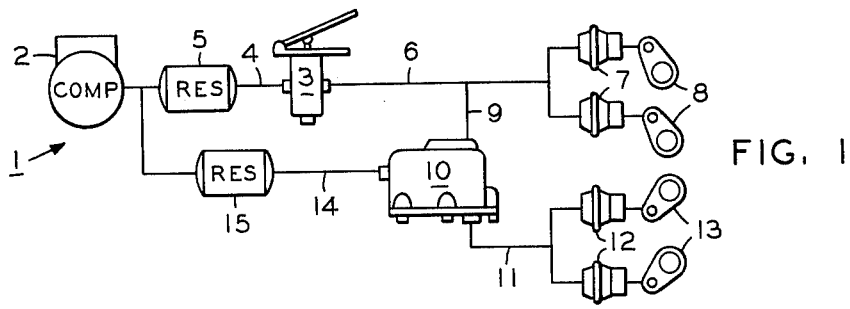
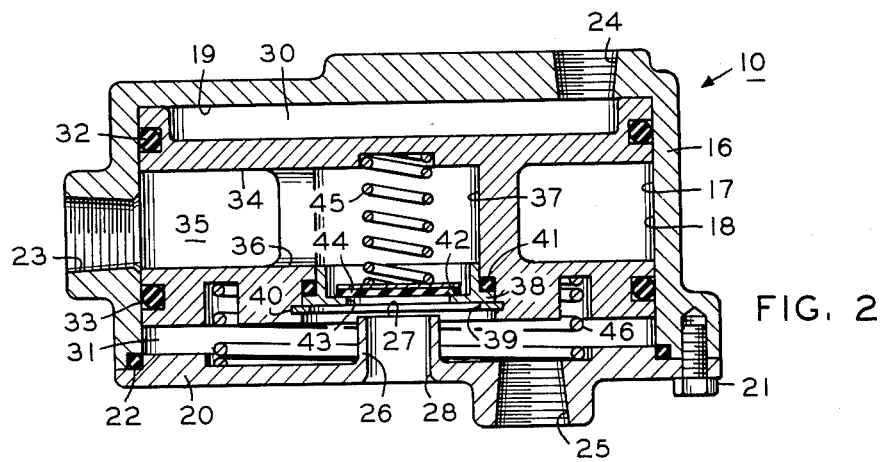
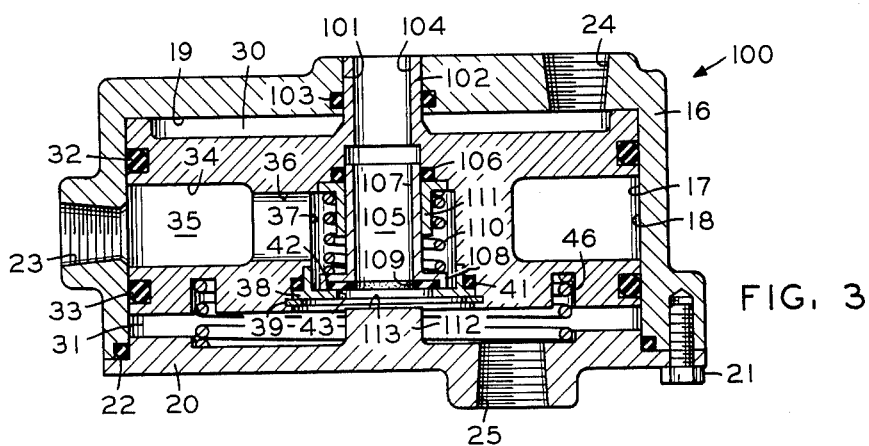

CONTROL VALVE AND SYSTEM

Filed Feb. 4, 1963 3 Sheets-Sheet 2

INVENTOR
RICHARD C. BUELER
BY
*Joseph E. Papin*

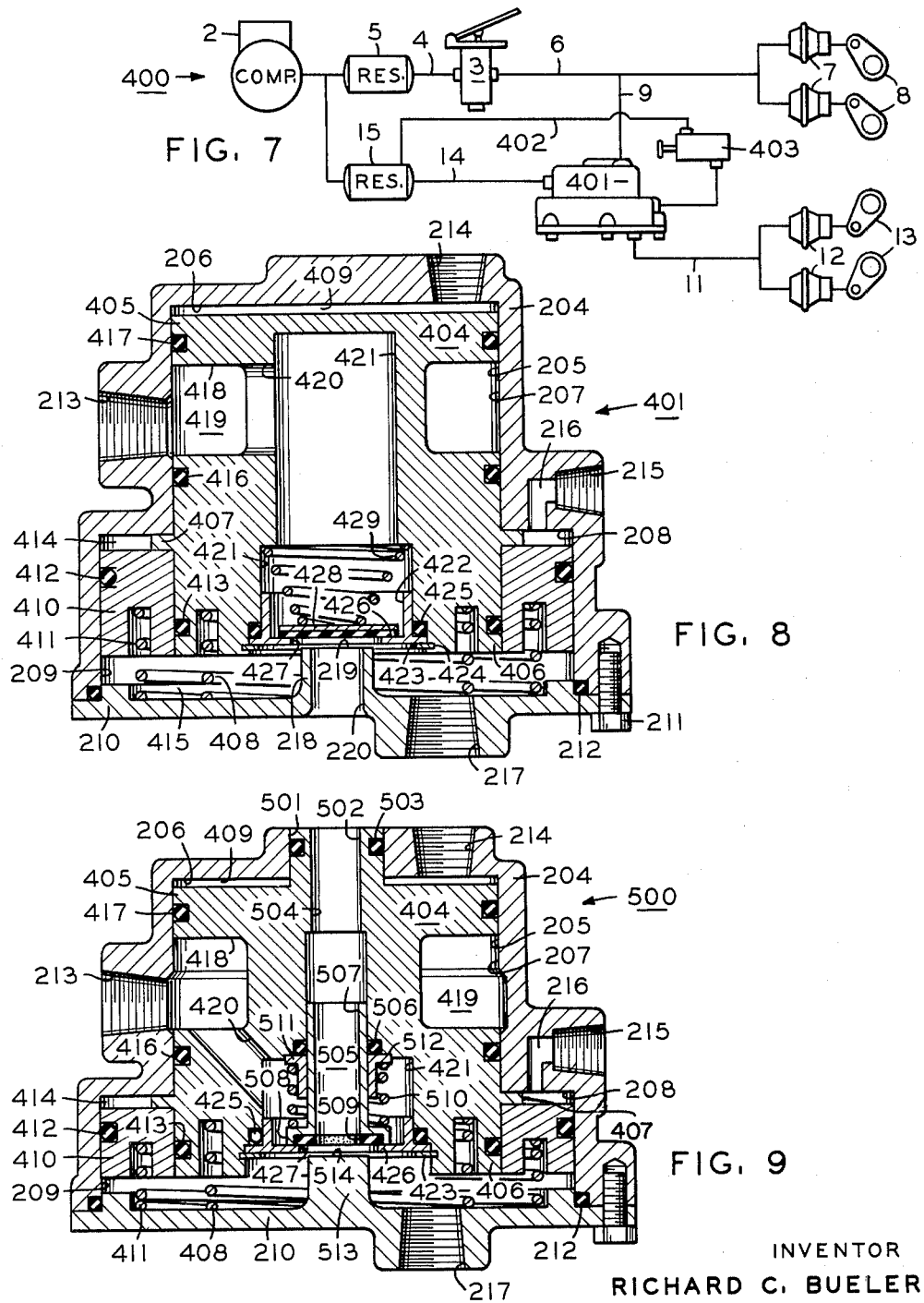

United States Patent Office 3,259,439
Patented July 5, 1966

3,259,439
CONTROL VALVE AND SYSTEM
Richard C. Bueler, Glendale, Mo., assignor to Wagner Electric Corporation, St. Louis, Mo., a corporation of Delaware
Filed Feb. 4, 1963, Ser. No. 255,937
11 Claims. (Cl. 303—40)

This invention relates to fluid pressure systems and in particular to a control valve for use therein.

An object of the present invention is to provide a fluid pressure system having relay valve means therein of compact and simplified construction.

Another object of the present invention is to provide control or relay valve means in which the valving thereof is contained in the relay piston.

Another object of the present invention is to provide a unitary control valve of compact and simplified construction which compatibly combines the relay and ratio features or characteristics of separate relay and ratio valves.

Another object of the present invention is to provide a fluid pressure system having a control valve therein which compatibly combines the relay and ratio features or characteristics of separate relay and ratio valves without appreciably increasing the inherent time lag of said system.

Still another object of the present invention is to provide a control valve for a fluid pressure system which compatibly combines the relay and ratio features or characteristics of separate relay and ratio valves without appreciably increasing the pressure differential between the input pressure applied to actuate said control valve and the resultant output pressure from said control valve.

These and other objects and advantages of the present invention will become more apparent hereinafter.

Briefly, the invention includes a fluid pressure system and control valve therefor having piston means with valve means therein movable in response to fluid pressure metered thereto from one fluid pressure source to a position in which said valve means controls the application of fluid pressure from another fluid pressure source to a fluid pressure responsive motor.

Figure 4:
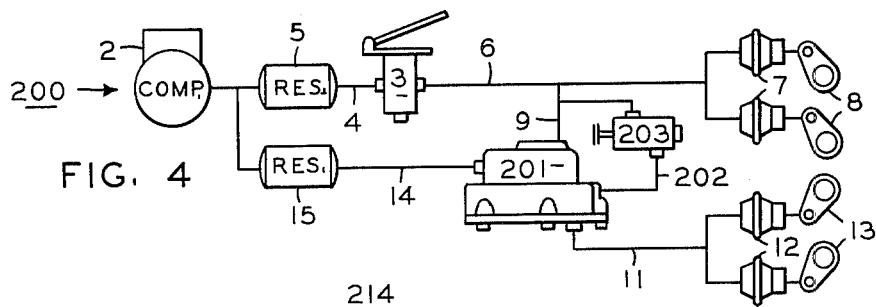
Figure 5:
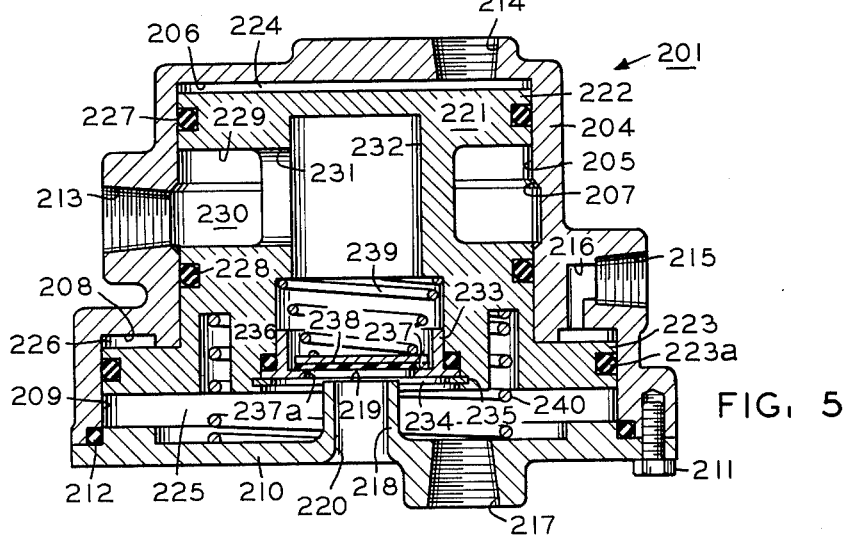
Figure 6:
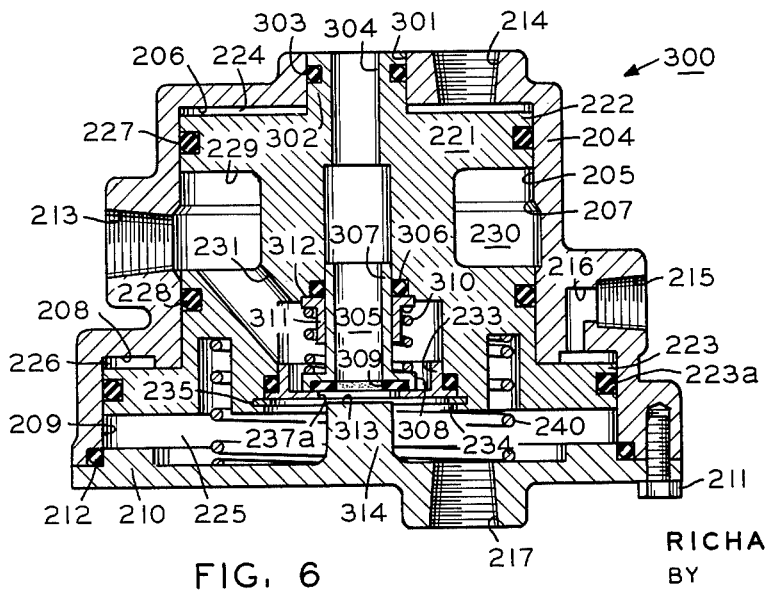

The invention also consists in the parts and arrangement of parts hereinafter described and claimed. In the accompanying drawings which form a part of the specification and wherein like numerals refer to like parts wherever they occur:

FIG. 1 is a diagrammatic view of a fluid pressure system showing control valve means therein embodying the present invention, FIG. 2 is a greatly enlarged cross-sectional view of the control valve means shown in FIG. 1, FIG. 3 is a cross-sectional view of another valve means embodying the present invention, FIG. 4 is a diagrammatic view of another fluid pressure system similar to the fluid pressure system illustrated in FIG. 1 and showing valve means therein embodying the present invention, FIG. 5 is a greatly enlarged cross-sectional view of the valve means shown in FIG. 4, FIG. 6 is a cross-sectional view of another valve means embodying the present invention, FIG. 7 is a diagrammatic view of the fluid pressure system similar to the fluid pressure system illustrated in FIG. 1 and showing valve means therein embodying the present invention, FIG. 8 is a greatly enlarged cross-sectional view of the valve means shown in FIG. 7, and FIG. 9 is a cross-sectional view of another valve means embodying the present invention.

Referring now to FIG. 1 in detail, a fluid pressure system, indicated generally at 1, is provided with a compressor 2 which is connected to the inlet side of an application valve 3 by a conduit 4 having a reservoir 5 interposed therein. A conduit or service line 6 has one end connected with the outlet side of the application valve 3 while the other end thereof branches to connect with servo motors or brake chambers 7 which are operatively linked with slack adjusters 8 to energize an axle set of wheel brake assemblies associated therewith (not shown). A conduit 9 is interposed between the conduit 6 and the control port of a control or relay valve 10, and another conduit 11 has one end connected with the outlet port of said control valve while the other end thereof branches to connect with servo motors or brake chambers 12 which are operatively connected to slack adjusters 13 to energize another axle set of wheel brake assemblies associated therewith (not shown). To complete the system 1, a conduit 14 has one end connected to the inlet port of the control valve 10 and the other end thereof intersects with the conduit 4 between the compressor 2 and reservoir 5 having another reservoir 15 interposed therein, the reservoirs 5 and 15 forming, in combination with said compressor, separate fluid pressure sources.

The control valve 10 is provided with a housing 16 having a bore 17 therein defined by a cylindrical side wall 18 intersected by an end wall 19, and a closure housing or plate 20 which serves as another end wall for said housing bore is attached to said housing by suitable means, such as a plurality of studs 21. A seal 22 is sealably interposed between the housing 16 and closure plate 20, and an inlet or reservoir port 23 which receives the conduit 14, as previously mentioned, is provided in said housing connecting with the bore side wall 18. A control port 24 which receives the conduit 9, as previously mentioned, is provided in the housing 16 connecting with the bore end wall 19, and an outlet or delivery port 25 which receives the conduit 11, as previously mentioned, is provided in the closure plate 20. An integral extension 26 is centrally provided on the closure plate 20 having an exhaust valve seat 27 on the free end thereof, and an exhaust passage or opening 28 provided in said closure plate extends coaxially through said valve seat and integral extension.

A relay piston 29 is slidably received in the bore 20 and defines therewith an expansible input or control chamber 30 and an output or reaction chamber 31 between the opposed pressure responsive faces thereof and the bore end wall 19 and closure plate 20, respectively, said control chamber being in open pressure fluid communication with the control port 24 and said reaction chamber normally being in open pressure fluid communication with the outlet port 25 and exhaust opening 28. The relay piston 29 is provided with spaced O-ring seals 32 and 33 in the peripheral portion thereof in sealing engagement with the bore side wall 18 and on opposite sides of the inlet port 23, and a peripheral groove 34 is provided in said relay piston between said O-ring seals 32 and 33 defining with said bore side wall an inlet chamber 35 in open pressure fluid communication with said inlet port. A connecting passage 36 is interposed between the peripheral groove 35 and a centrally located stepped bore or valve chamber 37 provided in the relay piston 29, and a valve seating member 38 is positioned against displacement from the stepped bore 37 by a snap ring 39 received in a cooperating groove 40 adjacent the lower end of said stepped bore with an O-ring 41 sealably engaged between the shoulder of said stepped bore and said valve seating member.

The valve seating member 38 is provided with a valve seat 42, and a passage 43 extends through said valve seating member and valve seat connecting the relay piston bore 37 with the reaction chamber 31. A valve element 44 is normally urged into sealing engagement with the valve seat 42 by the negligible compressive force of a valve spring 45 interposed between said valve element and the end wall of the relay piston bore 37, and a return spring 46 is positioned between the relay piston 29 and the closure plate 20 normally urging said relay piston into abutment with the bore end wall 19 and maintaining the valve element 44 in predetermined spaced relation with the exhaust valve seat 27.

In the operation, a manually applied force on the application valve 3 meters fluid pressure from the reservoir 5 through the conduit 4, said application valve and the conduit 6 into the brake chambers 7 which are responsive to actuate the slack adjusters 8 and energize the wheel brake assemblies associated therewith, and simultaneously the metered fluid pressure also flows into the control chamber 30 of the control valve 10 through the conduit 9 and control port 24. The input fluid pressure so established in the control chamber acts on the effective area of the relay piston 29 therein creating a control or input force to move said relay piston downwardly against the negligible force of the return spring 36 to initially engage the valve element 44 with the exhaust valve seat 27 closing the exhaust opening 28 in the closure member 20 and isolating the reaction chamber 31 from the atmosphere. Further downward movement of the relay piston 29 disengages the valve element 44 from the inlet valve seat 42 on the valve seating member 38 to establish pressure fluid communication between the inlet and outlet ports 23 and 25. The fluid pressure flows from the reservoir 15 through the conduit 14, the inlet port 23, the inlet chamber 35, the relay piston bore 37, the connecting passage 43, the reaction chamber 31, the outlet port 25 and the conduit 11 into the brake chambers 12 which are responsive to actuate slack adjusters 13 and energize the axle set of wheel brake assemblies associated therewith. This output pressure so established in the reaction chamber 31 acts on the effective area of the relay piston 29 therein to create a reaction force in opposition to the control force and when the reaction force attains a magnitude substantially equal to that of the control force, said relay piston is moved upwardly wherein the valve element 44 is positioned in lapped engagement with the inlet valve seat 42 and with the exhaust valve seat 27. Since the effective area of the relay piston 29 in the control chamber 30 and the reaction chamber 31 are substantially equal, the input and output pressures are therefore substantially equal. If a greater braking effort is desired, the manually applied force on the application valve 3 is increased which results in an increased control force, and the component parts of the control valve 10 function in the same manner as previously described to again move said component parts to their lapped position.

When the desired braking effort is attained, the operator applied force on the application valve 3 is removed, and the input fluid pressure is exhausted from the brake chambers 7 through the service line 6 and said application valve to atmosphere and simultaneously from the control chamber 30 through the conduit 9, said service line 6 and said brake chambers to atmosphere. In this manner, the control force is eliminated and the reaction force plus the compressive force of the return spring 46 serves to move the relay piston 29 upwardly to its original position. Initially this upward movement sealably re-engages the valve element 44 with the inlet valve seat 42 to interrupt pressure fluid communication between the inlet and outlet ports 23 and 25 and further upward movement disengages said valve member from the exhaust valve seat 27 to open the exhaust opening 28 and re-establish pressure fluid communication between the outlet port 25 and the atmosphere to eliminate the reaction force by exhausting the output fluid pressure from the brake chambers 12 through the conduit 11, the outlet port 25, the reaction chamber 31 and said exhaust opening.

Referring now to FIG. 3, a control or relay valve 100 is shown having substantially the same component parts and functioning in the system 1 in substantially the same manner as the previously described control valve 10 with the following exceptions. The control valve 100 is provided with a centrally located bore 101 extending through the bore end wall 19 to slidably receive an extension 102 integrally provided on the relay piston 29, and an O-ring 103 is carried in said bore 101 in sealing engagement with said extension. A valve bore 104 is co-axially provided through the extension 102 and the relay piston 29 to connect with the relay piston bore 27, and a valve element 105 is slidable in said valve bore with an O-ring seal 106 sealably engaged therebetween. The valve element 105 is provided with an exhaust bore or opening 107 therethrough which normally communicates the outlet port 25 with the atmosphere through the valve bore 104, and an enlarged sealing head 108 including an annular resilient seal or disc 109 is provided on the lower end of said valve element. A valve spring 110 has one end biased into engagement with the sealing head 108 to urge the sealing element 109 into engagement with the valve seat 42 to interrupt pressure fluid communication between the inlet and outlet ports 23 and 25 while the other end thereof is biased into engagement with a valve guide member 111. The closure plate 20 is provided with a centrally located extension 112 having an exhaust valve seat 113 on the free end thereof for sealing engagement with the valve seal 109.

In the operation, it is obvious that the control valve 100 functions in the system 1 in substantially the same manner as the previously described control valve 10 except that the outlet port 25 is exhausted to atmosphere through the reaction chamber 31, the exhaust opening 107 in the valve element and the piston passage 104. Further, it is apparent that the valve element 105 is concertedly movable with the relay piston 29 in response to fluid pressure metered into the control chamber 30 into sealing engagement with the exhaust valve seat 113 to close the exhaust opening 107, and said relay piston is thereafter movable relative to said valve element to disengage the seat 42 therefrom to open the passage 43 and establish pressure fluid communication between the inlet and outlet ports 23 and 25.

Referring now to FIG. 4, a fluid pressure system 200 is shown having substantially the same component parts and functioning in substantially the same manner as the previously described system 1 with the following exceptions. The system 200 is provided with a control or ratio relay valve 201 having its inlet port connected with the conduit 14, its outlet port connected with the conduit 11 and its control port connected with the conduit 9. To complete the system 200, a conduit 202 has one end intersecting with the conduit 9 while the other end thereof connects with another control or ratio port in the control valve 201, and a two-way or push-pull valve 203 is interposed in said conduit 202, said push-pull valve being movable between two positions, i.e., one position providing open pressure fluid communication through the conduit 202 between the ratio port of said control valve and the conduit 9 and another or second position interrupting said pressure fluid communication and connecting the ratio port of said control valve to the atmosphere.

The control valve 201, FIG. 5, is provided with a housing 204 having a stepped bore 205 therein defined by a radially extending end wall 206 which intersects with a side wall 207 at one end thereof and a radially extending shoulder 208 which interconnects between the other end thereof and another side wall 209. A closure housing or plate 210 which serves as the other end wall of the housing bore 205 is attached to the housing 204 by suitable means such as a plurality of studs 211, and a seal 212 is interposed between said closure plate and housing. An inlet or reservoir port 213 which receives the conduit 14, as previously mentioned, is provided in the housing 204 intersecting with the bore side wall 207, and a control port 214 which receives the conduit 9, as previously mentioned, is provided in said housing intersecting with the bore end wall 206. Another control or ratio port 215 which receives the conduit 202, as previously mentioned, is provided in said housing in communication with a passage 216 which intersects with the radial shoulder 208, and an outlet or delivery port 217 which receives the conduit 11, as previously mentioned, is provided in the closure plate 210. An integral extension 218 is centrally provided on the closure plate 210 having an exhaust valve seat 219 on the free end thereof, and an exhaust passage or opening 220 provided in said closure plate extends coaxially through said valve seat and extension.

A relay piston 221 is provided with a cylinder portion or sleeve 222 which is slidably received in the bore side wall 207 and an integrally formed radially extending flange 223 which is slidably received in the bore side wall 209, and an O-ring seal 223a is carried in said flange in sealing engagement with said bore side wall 209. A control or input chamber 224 is formed in the bore side wall 207 between the end wall 206 and the upper end of the sleeve 222 in open pressure fluid communication with the control port 214, and a reaction or output chamber 225 is formed in the bore side wall 209 between the lower end of the flange 223 and the closure plate 210 in open pressure fluid communication with the outlet port 217 and exhaust opening 220. Another control or ratio port 226 is also provided between the radial shoulder 208 and the upper end of the flange 223 and between the bore side wall 209 and the peripheral surface of the sleeve 222 in open pressure fluid communication with the passage 216 and ratio port 215. The sleeve 222 is provided with spaced O-ring seals 227 and 228 in the peripheral surface thereof in sealing engagement with the bore side wall 209 on opposite sides of the inlet port 213, and a peripheral groove 229 is provided in said sleeve between said O-ring seals defining with said bore side wall an inlet chamber 230 in open pressure fluid communication with said inlet port. A passage 231 is interposed between the peripheral groove 229 and a centrally located stepped bore or valve chamber 232 provided in the relay piston 221, and a valve seating member 233 is positioned against displacement from the stepped bore 232 by a snap ring 234 received in a cooperating groove 235 adjacent the lower end of said stepped bore with an O-ring 236 sealably engaged between the shoulder of said stepped bore 232 and said valve seating member.

The valve seating member 233 is provided with a valve seat 237, and a connecting passage 237a extends through said valve seat and valve seating member connecting the relay piston bore 232 with the reaction chamber 225. A valve element 238 is normally urged into sealing engagement with the valve seat 237 by the negligible force of a valve spring 239, and a return spring 240 is biased between the relay piston 221 and the closure plate 210 normally urging said relay piston toward an inoperative position into engagement with the bore end wall 206 and maintain the valve element 238 in predetermined spaced relation with the exhaust valve seat 219.

It will be noted that the effective cross-sectional area $A_1$ of the sleeve 222 responsive to fluid pressure in the control chamber 224 plus the effective annular cross-sectional area $A_2$ of the flange 223 responsive to fluid pressure in the ratio chamber 226 are substantially equal and opposite to the effective cross-sectional area $A_3$ of the relay piston 221 responsive to fluid pressure in the reaction chamber 225.

In the operation, when the operator desires to effect a ratio braking application, the push-pull valve 203 is moved to its position interrupting pressure fluid flow from the conduit 9 through the conduit 202 to the ratio port 215 of the control valve 201 and exhausting the ratio chamber 226 to atmosphere via the passage 216, said ratio port and the conduit 202. An operator applied force on the application valve 3 meters fluid pressure from the reservoir 4 through the conduit 6 into brake chambers 7 which actuate slack adjusters 8 to energize the axle set of wheel brake assemblies associated therewith, and simultaneously the metered fluid pressure also flows through the conduit 9 into the control or application chamber 224 of the control valve 201. The input fluid pressure so established in the control chamber 224 acts on the effective area $A_1$ of the piston 229 creating a control or input force to move said piston downwardly against the negligible compressive force of the return spring 240 to engage the valve element 238 with the exhaust valve seat 219 closing the exhaust opening 220 and isolating the reaction chamber 225 from the atmosphere. Further downward movement of the piston 221 disengages the valve seat 237 on the valve seating member 233 from the valve element 238 to open the connecting passage 237a and establish pressure fluid communication between the inlet and outlet ports 213 and 217. The pressure fluid flows from the reservoir 15 through the conduit 14, the inlet port 213, the inlet chamber 230, the passage 231, the valve chamber 232, the connecting passage 237a, the reaction chamber 225, and the outlet port 217 and conduit 11 into the brake chambers 12 which actuate slack adjusters 13 to energize the axle set of wheel brake assemblies associated therewith. This output fluid pressure so established in the reaction chamber 225 and acting on the effective area $A_3$ of the piston 221 creates a reaction force in opposition to the control force, and when the reaction force attains a magnitude substantially equal to that of the conrol force, said piston is moved upwardly wherein the valve element 238 is positioned in lapped engagement with the inlet valve seat 237 and the exhaust valve seat 219. Since the control area $A_2$ of the piston 221 is proportionably less than the reaction area $A_3$ thereof, a proportionably smaller output pressure is required on the reaction area $A_3$ to maintain the reaction force substantially equal to or in balance with the proportionally larger input fluid pressure acting on the smaller control area $A_1$. If a greater braking effort is desired, the manually applied force on the application valve 3 is increased which results in an increased control force, and the component parts of the control valve 201 function in the same manner, as previously described, to again move said component parts to their lapped positions.

When the desired ratio braking effect is attained, the operator applied force on the application valve 3 is removed, and the input fluid pressure is exhausted from the brake chambers 7 through the conduit 6 and said application valve to the atmosphere and simultaneously from the control chamber 224 of the control valve 201 through the control port 214, the conduits 9 and 6 and said application valve to the atmosphere. In this manner, the control force on the piston 221 is eliminated, and the reaction force and the compressive force of the return spring 240 moves said piston upwardly to its original inoperative position. Initially, this upward movement re-engages the inlet valve seat 237 with the valve element to close the connecting passage 237a and interrupt pressure fluid communication between the inlet and outlet ports 213 and 217, and further upward movement disengages said valve element from the exhaust valve seat 219 to open the exhaust opening 220 and re-establish pressure fluid communication between said outlet port 217 and the atmosphere to eliminate the reaction force and de-energize the wheel brake assemblies associated therewith by exhausting the output fluid pressure from the brake chambers 12 through the conduit 11, the outlet port 217, the reaction chamber 225, and the exhaust opening 219.

When the operator desires to effect a so-called 1:1 braking application, the push-pull valve 203 is moved to its other position which connects the conduit 9 in open pressure fluid communication with the ratio chamber 226 in the control valve 201 through the conduit 202, the ratio port 215 and the passage 216. Accordingly, under these conditions, it is apparent that the input fluid pressure metered by the operator applied force on the application valve 3 to actuate the brake chambers 7 is also simultaneously metered to both the control and ratio chambers 224 and 226 of the control valve 201. The input fluid pressures so established in the control and ratio chambers 224 and 226 act on the control and ratio areas $A_1$ and $A_2$ of the piston 221 creating a control force to move said piston downwardly to again actuate the valve element 238 and establish an output pressure to again actuate the brake chamber 12 and act on the reaction area $A_3$ in the reaction chamber 225 creating a reaction force in opposition to the control force, as previously described. Since the control and ratio areas $A_1$ and $A_2$ are substantially equal to the reaction area $A_3$, the output fluid pressure is substantially equal to the input fluid pressure, i.e., in the so-called 1:1 ratio.

Referring now to FIG. 6, a control or ratio relay valve 300 is shown having substantially the same component parts and functioning in the system 200 in substantially the same manner as the previously described control valve 201 with the following exceptions. The control valve 300 is provided with a centrally located bore 301 extending through the bore end wall 206 of the housing 204 to slidably receive an extension 302 integrally provided on the piston 221, and an O-ring 303 is carried in said extension in sealing engagement with the bore 301. Another bore 304 is coaxially provided through the extension 303 and the piston 221 to connect with the valve chamber 232, and a valve element 305 is slidable in the bore 304 with an O-ring seal 306 sealably engaged therebetween. The valve element 305 is provided with an exhaust bore or opening 307 therethrough which normally communicates the outlet port 217 with the atmosphere through the piston bore 304, and an enlarged sealing head 308 including an annular resilient seal or disc 309 is provided on the lower end of said valve element. A valve spring 310 has one end biased against the sealing head 308 to urge the valve seal 309 into engagement with the inlet valve seat 237 on the valve seating member 233 to interrupt pressure fluid communication through the connecting passage 237a between the inlet and outlet ports 213 and 217, and the other end of said spring is biased against a valve guide member 311 which slidably and guidably receives the valve element 305 to maintain said valve guide member seated in engagement with the seal 306 and in a recess 312 circumferentially provided about the lower end of the piston bore 304. The closure plate 210 is provided with a centrally located extension 313 having an exhaust valve seat 314 on the free end thereof for sealing engagement with the valve seal 309; and if desired, another exhaust opening (not shown) could be coaxially provided in said closure plate through said valve seat and extension. It is apparent that the control valve 300 functions in the system 200 in substantially the same manner as the previously described control valve 201 except that the valve element 305 is engaged with the exhaust valve seat 314 to close the exhaust opening 307 and isolate the reaction chamber 225 from the atmosphere.

Referring now to FIG. 7, a fluid pressure system 400 is shown having substantially the same component parts and functioning in substantially the same manner as the previously described systems 1 and 200 with the following exceptions. The system 400 is provided with a control or ratio relay valve 401 having its inlet port connected with the conduit 11 and its control port connected with the conduit 9. To complete the system 400, a conduit 402 has one end connected with the reservoir 15 while the other end thereof connects with another control or ratio port of the control valve 401, and a two-way or push-pull valve 403 is interposed in the conduit 402 being movable between two positions, i.e., one position providing open pressure fluid communication between the reservoir 15 and the ratio port of the control valve 401 through the conduit 402 and another or second position interrupting said pressure fluid communication and connecting the ratio port of said control valve to the atmosphere.

The control valve 401, FIG. 8, is shown having substantially the same component parts functioning in substantially the same manner as the previously described control valve 201 with the following exceptions. The control valve 401 is provided with relay piston 404 having an upper end portion 405 which is slidably received in the bore side wall 207 and a lower end portion 406 which extends coaxially with the bore side wall 209. An annular flange 407 is circumferentially provided around the relay piston 404 for abutment with the radial shoulder 208, and a return spring 408 is biased between the closure plate 210 and the relay piston lower end portion 406 to normally urge the relay piston 404 toward its inoperative position, as shown. It will be noted that the effective cross-sectional areas $A_1$ and $A_2$ of the relay piston upper and lower end portions 405 and 406, respectively, are substantially equal and that said relay piston upper end portion and the bore end wall 206 define a control or application chamber 409 in the bore side wall 207 in open pressure fluid communication with the control port 214. An annular ratio piston 410 is slidable between the bore side wall 209 and the relay piston lower end portion 406, and a spring 411 is interposed between said ratio piston and the closure plate 210 to normally urge said ratio piston into abutment with the relay piston flange 407 so that said ratio piston and the relay piston 404 may be engaged with each other for concert movement. O-ring seals 412 and 413 are positioned in sealing engagement between the ratio piston 410 and the bore side wall 209 and the relay piston lower end portion 406, respectively, and an annular ratio chamber 414 is defined between the radial shoulder 208 and said ratio piston and between the bore side wall 209 and the relay piston lower end portion 406 in open pressure fluid communication with the ratio port and passages 215 and 216. It will be noted that a reaction or outlet chamber 415 is defined in the bore side wall 209 between the closure plate 210 and the ratio piston 410 and relay piston lower end portion 406 in open pressure fluid communication with the outlet port 217 and exhaust opening 220.

Spaced O-ring seals 416 and 417 are provided in the relay piston upper end portion 405 in sealing engagement with the bore side wall 207 on opposite sides of the inlet port 213, and a peripheral groove 418 is provided in said relay piston upper end portion between said O-ring seals defining with said bore side wall are inlet chamber 419 in open pressure fluid communication with said inlet port. A passage 420 is interposed between the peripheral groove 418 and a centrally located stepped bore or valve chamber 421 provided in the relay piston 404, and a valve seating member 422 is positioned against displacement from the bore 421 by a snap ring 423 received in a cooperating groove 424 adjacent the lower end of said bore 421 with an O-ring seal 425 sealably engaged between the shoulder of said stepped bore 421 and said valve seating member.

The valve seating member 422 is provided with a valve seat 426, and a connecting passage 427 extends coaxially through said valve seat and valve seating member connecting the relay piston bore 421 with the reaction chamber 415. A valve element 428 is normally urged into sealing engagement with the inlet valve seat 426 by the negligible compressive force of a valve spring 429, and the relay piston return spring 408 normally maintains said valve element in predetermined spaced relation with the exhaust valve seat 219 on the closure plate extension 218.

In the operation, when the operator desires to effect a ratio braking application, the push-pull valve 403 is moved to its position interrupting pressure fluid flow from the reservoir 15 through the conduit 402 and exhausting pressure fluid from the ratio chamber 414 of the control valve 401 to atmosphere via the ratio port and passage 215 and 216 and said conduit 402. An operator applied force on the application valve 3 meters fluid pressure from the reservoir 5 through conduits 4 and 6 into brake chambers 7 which actuate slack adjusters 8 and energize the axle set of vehicle brake assemblies associated therewith, and simultaneously the metered fluid pressure also flows through the conduit 9 into the control or application chamber 409 of the control valve 401. The input fluid pressure so established in the control chamber 409 acts on the effective area $A_1$ of the relay piston 404 creating a control or input force to move said relay piston downwardly against the negligible compressive force of the return spring 408 to initially engage the valve element 428 with the exhaust valve seat 219 closing the exhaust opening 220 and isolating the reaction chamber 415 from the atmosphere. Since the ratio piston 410 is normally biased into abutment with the relay piston flange 407, the initial downward movement of the relay piston 404 also effects concert downward movement of said ratio piston against the negligible compressive force of the return spring 411. Further concert movement of the relay and ratio pistons 404 and 410 disengages the inlet valve seat 426 from the valve element 428 to open the connecting passage 427 and establish pressure fluid communication between the inlet and outlet ports 213 and 217. The pressure fluid flows from the reservoir 15 through the conduit 14, the inlet port 213, the inlet chamber 419, the passage 420, the relay piston bore 421, the connecting passage 427, the reaction chamber 415, the outlet port 217 and the conduit 11 into the brake chambers 12 to actuate slack adjusters 13 and energize the axle set of vehicle brake assemblies associated therewith. The output fluid pressure so established in the reaction chamber and acting on the effective cross-sectional areas $A_2$ and $A_3$ of the relay piston lower end portion 406 and the ratio piston 410, respectively, creates a reaction force in opposition to the control force, and when the reaction force attains a magnitude substantially equal to that of the control force, said relay and ratio pistons are concertly moved upwardly wherein the valve element 428 is positioned in lapped engagement with the inlet valve seat 426 and the exhaust valve seat 219. Since the effective area $A_2$ of the relay piston upper end portion 405 is less than the combined effective areas $A_2$ and $A_3$ of the relay piston lower end portion 406 and ratio piston 410, a proportionally smaller output pressure is required on the effective areas $A_2$ and $A_3$ to maintain the reaction force substantially equal to or in balance with the control force of the proportionally larger input fluid pressure acting on the smaller effective area $A_1$. If greater braking effort is desired, the manually applied force on the application valve 3 is increased which results in an increased application force, and the component parts of the control valve 401 function in the same manner, as previously described, to again move said component parts to their lapped positions.

When the desired braking effort is attained, the operator applied force on the application valve 3 is removed, and the input fluid pressure is exhausted from the brake chambers 7 through the service line 6 and said application valve to atmosphere and simultaneously from the control chamber 409 through the conduits 9 and 6 and said application valve to atmosphere. In this manner, the control force is eliminated, and the reaction force plus the forces of springs 408 and 411 move the relay and ratio pistons 404 and 410 upwardly to their original positions. Initially, this upward movement sealably re-engages the inlet valve seat 426 with the valve element 428 to close the connecting passage 427 and interrupt pressure fluid communication between the inlet and outlet ports 213 and 217, and further upward movement disengages the valve element 428 from the exhaust valve seat 219 to open the exhaust opening 220 and re-establish pressure fluid communication between the outlet port 217 and the atmosphere to eliminate the reaction force by exhausting the output fluid pressure to atmosphere from the brake chambers 12 through the conduit 11, the outlet port 217, the reaction chamber 415 and said exhaust opening.

When the operator desires to effect the so-called 1:1 braking application, the push-pull valve 403 is moved to its other position which connects the reservoir 15 in open pressure fluid communication with the ratio chamber 414 of the control valve 401 through the conduit 402 and the ratio port and passage 215 and 216. In this manner, the fluid pressure applied to the ratio chamber 414 from the reservoir 15 acts on the effective area $A_3$ of the ratio piston 410 in said ratio piston downwardly independently of the relay piston 404 and against the force of the return spring 411 into a disabled or inoperative position in engagement with the closure plate 210. In as much as the fluid pressure of the reservoir 15 will normally exceed, or at least be equal to, the output fluid pressure in the reaction chamber 415 during a 1:1 braking application, it is apparent that the ratio piston 410 will be effectively rendered inoperative during the 1:1 operation of the system 400. With the ratio piston 404 so disabled, it is also apparent that the input fluid pressure on the control chamber 409 acts on the effective area $A_1$ of the relay piston upper end portion 405 creating a control force to move the relay piston 404 downwardly independently of said ratio piston to again actuate the valve element 428 and establish an output fluid pressure in the reaction chamber 415 which acts on the effective area $A_2$ of the relay piston lower end portion 406 to create a reaction force in opposition to the applied force, as previously described. Since the effective areas $A_1$ and $A_2$ are substantially equal, the output fluid pressure established in the reaction chamber 415 is substantially equal to the input fluid pressure established in the control chamber 409, i.e., in the so-called 1:1 ratio.

Referring now to FIG. 9, a control or ratio relay valve 500 is shown having substantially the same component parts and functioning in the system 400 in substantially the same manner as the previously described control valve 401 with the following exceptions. The control valve 500 is provided with a centrally located bore 501 extending through the bore end wall 206 of the housing 204 to slidably receive an extension 502 integrally provided on the relay piston 404, and an O-ring seal 503 is positioned in sealing engagement between the bore 501 and extension 502. Another bore 504 is coaxially provided through the extension 503 and the relay piston 404 to connect with the valve chamber 421, and a valve element 505 is slidable in the bore 504 with an O-ring seal 506 sealably engaged therebetween. The valve element 505 is provided with an exhaust opening 507 therethrough which normally communicates the outlet port 217 with the atmosphere through the relay piston bore 504, and an enlarged sealing head 508 including an annular resilient seal or disc 509 is provided on the lower end of said valve element. A valve spring 510 has one end biased against the sealing head 508 to urge the valve seal 509 into engagement with the inlet valve seat 426 on the valve seating member 422 to interrupt pressure fluid communication through the connecting passage 427 between the inlet and outlet ports 213 and 217, and the other end of said valve spring is biased against a valve guide member 511 which slidably and guidably receives the valve element 505 to maintain said valve guide member seated in engagement with the O-ring seal 506 and in a recess 512 circumferentially provided about the lower end of the relay piston bore 504. The closure plate 210 is provided with a centrally located extension 513 having an exhaust valve seat 514 on the free end thereof for sealing engagement with the valve seal 509, and if desired, another exhaust opening (not shown) could be coaxially provided in said closure plate through said valve seat and extension. It is apparent that the control valve 500 functions in the system 400 in substantially the same manner as the previously described control valve 401 except that the valve element 505 is engaged with the exhaust valve seat 514 to close the exhaust opening 507 and isolate the reaction chamber 415 from the atmosphere.

From the foregoing, it is apparent that novel fluid pressure systems 1, 200, 400 and novel control valves 10, 100, 201, 300, 401 and 500 are provided. For instance, all of the control valves are provided with piston members in which the valving or valve elements are housed thereby providing a more compact and simplified control valve. Further, all of the wearing ports in the control valves are contained in the piston members which are removable in a unit to provide for cartridge type replacement. In addition, the combination ratio and relay features of the instant unitary ratio relay valves do not increase the system time lag factor, and, in fact, effect substantially the same time lag incurred in past known systems having only one or the other of the past known separate relay valves or ratio valves therein. This is apparent since the instant unitary ratio relay valves perform both the relay and ratio functions in the instant ratio relay systems which formerly necessitated a separate ratio changing valve and a relay valve in the past known systems. Further, the combination ratio and relay features of the instant unitary ratio relay valves do not appreciably enlarge the physical construction or measurements thereof over those of past known relay valves which did not incorporate the ratio feature. This is apparent since the instant ratio relay valves utilize substantially the same effective areas to accomplish both the ratio and relay feature thereof as those effective areas utilized in past known relay valves to accomplish only the relay feature. It is also apparent that the incorporation of both the ratio and relay features into the instant unitary ratio relay valves permits the use of much larger control, ratio, and reaction areas which were rather limited in past known ratio changing valves; therefore, the pressure differential between the input and output sides of the instant ratio relay valves (approximately two p.s.i.) is appreciably less than the pressure differential across the past known ratio changing valves (approximately six p.s.i.) and substantially the same as the pressure differential across the past known relay valves (approximately two p.s.i.). It therefore follows that the pressure drop across the instant ratio relay valves is appreciably less than that across the past known ratio changing valves and relay valve serially connected in past known systems and that during the so-called 1:1 braking application the output pressure of the instant ratio relay valves will more closely approximate the input pressure. In view of the above, it is apparent that the instant ratio relay valves provide for a greater braking effort in the brake chamber to which the output pressure is delivered than is attained by the past known ratio changing valves and relay valves serially connected in past known systems.

It is now apparent that novel fluid pressure systems and novel control valves meeting the objects set out hereinbefore are provided and that changes and modifications as to the precise configurations, shapes and details of the constructions set forth in the disclosure by way of illustration may be made by those skilled in the art without departing from the spirit of the invention as defined by the claims which follow.

What I claim is:

1. In a fluid pressure system comprising a fluid pressure source and a pair of fluid pressure responsive motors, metering means for metering fluid pressure from said source to one of said motors, and control means responsive to the fluid pressure metered to said one motor for controlling the application of fluid pressure between said source and the other of said motors including a pair of concertedly and independently movable application means, one of said application means defining with said control means an expansible fluid pressure control chamber for connection in pressure fluid communication with said metering means, means within said control means including said pair of application means defining a pressure fluid flow passage separate from said control chamber and for connection between said source and said other motor, said pair of application means being concertedly movable in response to the metered fluid pressure in said control chamber to effect the application of fluid pressure through said flow passage from said source to said other motor in a predetermined ratio with that metered to said one motor, and other means for selectively disabling said other application means, said one application means being thereafter independently movable in response to the metered fluid pressure in said control chamber to effect the application of fluid pressure through said flow passage from said source to said other motor in a ratio with that metered to said one motor different than the predetermined ratio.

2. In a fluid pressure system comprising a fluid pressure source and a fluid pressure responsive motor, control means for controlling the application of fluid pressure between said source and motor including a pair of concertedly and independently movable application means, a control chamber in said control means adjacent to one of said application means, metering means for metering fluid pressure from said source to said control chamber, said pair of application means defining with said control means a pressure fluid flow passage separate from said control chamber and connected between said source and motor, said pair of application means being concertedly movable in response to fluid pressure metered to said control chamber to effect the application of fluid pressure through said flow passage from said source to said motor in a predetermined ratio with the metered fluid pressure, and selectively operable means connected between said source and control means for selectively subjecting one of said application means to the fluid pressure at said source and the atmosphere, said one application means being independently movable toward a disabled position in said control means when subjected to the fluid pressure at said source, and the other of said application means being thereafter movable in response to the metered fluid pressure independently of said one application means to effect the application of fluid pressure through said flow passage from said source to said motor in a ratio with the metered fluid pressure different than the predetermined ratio.

3. A control valve for fluid pressure comprising a housing having inlet, outlet, and control ports therein, a pair of piston means concertedly and independently movable in said housing, passage means in one of said piston means between said inlet and outlet ports, valve means in said passage means controlling pressure fluid communication therethrough between said inlet and outlet ports, said pair of piston means being concertedly movable in response to fluid pressure at said control port to move said valve means to a position in said passage means establishing pressure fluid communication therethrough between said inlet and outlet ports, the established fluid pressure at said outlet port acting to oppose further concerted movement of said pair of piston means and being in a predetermined ratio with that at said control port, and means for disabling the other of said piston means, said one piston means being thereafter movable independently of said disabled other piston means in response to the fluid pressure at said control port to further actuate said valve means and established another fluid pressure at said outlet port in a ratio with that at said control port different than the predetermined ratio.

4. The control valve according to claim 3 wherein said valve means is normally urged to a position in said passage means interrupting pressure fluid communication between said inlet and outlet ports, a valve seat in said housing for engagement with said valve means, said pair of piston means being initially concertedly movable to engage said valve means with said valve seat and thereafter concertedly movable relative to said valve means to open said passage means and establish pressure fluid communication between said inlet and outlet ports.

5. The control valve according to claim 4 including exhaust passage means in said housing and extending through said valve seat normally venting said outlet port to the atmosphere, said exhaust passage being closed upon the engagement of said valve means with said valve seat.

6. The control valve according to claim 4 including another valve seat on said one piston means and in circumscribing relation with said passage means, said valve means being normally urged into engagement with said other valve seat to interrupt the pressure fluid communication between said inlet and outlet ports, and the movement of said one piston means relative to said valve means subsequent to the engagement thereof with said first named valve seat serving to disengage said other valve seat from said valve means and establish pressure fluid communication between said inlet and outlet ports.

7. The control valve according to claim 4 including means within said valve means and said one piston means providing an exhaust passage normally venting said outlet port to the atmosphere, said exhaust passage being closed upon the engagement of said valve means with said valve seat.

8. A control valve for fluid pressure comprising a housing having inlet, outlet, ratio and control ports therein, a pair of piston means concertedly and independently movable in said housing, passage means in one of said piston means between said inlet and outlet ports, valve means in said passage means controlling pressure fluid communication therethrough between said inlet and outlet ports, opposed ends on said one piston means having substantially equal areas respectively responsive to fluid pressure at said control and outlet ports, other opposed ends on the other of said piston means having substantially equal areas respectively responsive to fluid pressure at said control and outlet ports, abutment means for engagement between said pair of piston means to effect the concerted movement thereof, said pair of piston means being concertedly movable in response to fluid pressure at said control port acting on one end area of said one piston means to move said valve means to a position in said passage means establishing pressure fluid communication between said inlet and outlet ports, the established fluid pressure at said outlet port acting on the other end area of said one piston means and one of the end areas of said other piston means to oppose further concerted movement thereof and having a magnitude proportionally less than that of the fluid pressure at said control port acting on only said one end area of said one piston means, said other piston means being movable to an inoperative position in said housing independently of said one piston means to disengage said abutment means in response to fluid pressure at said ratio port acting on the other of the end areas thereof and having a magnitude in excess of that of the established fluid pressure at said outlet port acting on said one end area thereof, and said one piston means being thereafter movable independently of said other piston means in response to the fluid pressure at said control port and the established fluid pressure at said outlet port respectively acting on the substantially equal one and other end areas thereof to further actuate said valve means and effect substantially equal magnitudes therebetween.

9. A control valve for fluid pressure comprising a housing, a bore and counterbore aligned in said housing and defining a radial shoulder therebetween, piston means slidable in said bore and extending coaxially into said counterbore, an expansible control chamber defined in said bore between the end wall thereof and said piston means, a control port in said housing connecting with said control chamber, an annular piston member slidably engaged between said piston means and said counterbore, an expansible ratio chamber defined in said housing between said piston member and shoulder and between said piston means and counterbore, a ratio port in said housing connected with said ratio chamber, an outlet chamber defined in said counterbore between the end wall thereof and said piston means and piston member, an outlet port in said housing connected with said outlet chamber, an inlet port in said housing intersecting with the side wall of said bore, peripheral groove means in said piston means in open pressure fluid communication with said inlet port at all times, a valve chamber in said piston means, first passage means in said piston means interconnecting said valve chamber and peripheral groove means, second passage means in said piston means interconnecting said valve chamber and outlet chamber, a first valve seat on said piston means in circumscribing relation with said second passage means and facing said valve chamber, valve means in said valve chamber and normally urged into engagement with said first valve seat to interrupt pressure fluid communication between said inlet and outlet ports, a second valve seat on the end wall of said counterbore and substantially coaxial with said second passage means for engagement with said valve means, said piston member being movable relative to said piston means to a disabled position in engagement with a portion of the end wall of said counterbore in response to fluid pressure in excess of a predetermined value at said ratio port, said piston means being initially movable relative to said disabled piston member in response to fluid pressure at said control port to engage said valve means with said second valve seat and said piston means being thereafter movable relative to said valve means to disengage said first valve seat therefrom and establish pressure fluid communication between said inlet and outlet ports, the established fluid pressure at said outlet port opposing further movement of said piston means and being in a predetermined ratio with that at said control port, and flange means engaged between said piston means and annular piston to effect substantially concerted movement thereof in response to fluid pressure at said control port and in the absence of pressure fluid at said ratio port to actuate said valve means and establish fluid pressure at said outlet port in opposition to the concerted movement of said piston means and piston member and in another predetermined ratio with that at said control port different than the first named predetermined ratio.

10. The control valve according to claim 3 comprising abutment means engaged between said pair of piston means to effect the concerted movement thereof in response to fluid pressure at said control port, said abutment means being disengaged when said other piston means is disabled.

11. In a fluid pressure system comprising a fluid pressure source and a fluid pressure responsive motor, a control valve including a housing, a pair of piston means for concerted and independent movement in said housing and having opposed ends, a control chamber in said housing adjacent to one opposed end of one of said piston means, a ratio chamber in said housing adjacent to one opposed end of the other of said piston means, an outlet chamber in said housing adjacent to the other opposed ends of said pair of piston means and connected with said motor, said one piston means defining with said housing an inlet chamber between the opposed ends thereof and connected with said source and said outlet chamber, valve means in said one piston means normally interrupting pressure fluid communication between said inlet and outlet chambers, metering means for metering fluid pressure from said source to said control chamber, said pair of piston means being concertedly movable in response to metered fluid pressure in said control chamber acting on the one opposed end of said one piston means to move said valve means to a position establishing pressure fluid communication between said inlet and outlet chambers, the established fluid pressure in said outlet chamber acting on the other opposed ends of said pair of piston means to oppose further concerted movement thereof and being in a predetermined ratio with the metered fluid pressure, and means connected between said source and said ratio chamber including selectively operable means normally interrupting pressure fluid communication between said source and ratio chamber and venting said ratio chamber to the atmosphere and movable to a charging position interrupting pressure fluid communication between said ratio chamber and the atmosphere and subjecting said ratio chamber to the fluid pressure at said source, said other piston means being movable independently of said one piston means to a disabled position in said housing in response to the source fluid pressure in said ratio chamber acting on said one opposed end thereof in excess of the established fluid pressure in said outlet chamber acting on the other opposed end thereof when said selectively operable means is moved to its charging position, and said one piston means being thereafter further movable independently of said other piston means in response to the metered fluid pressure to further actuate said valve means and establish another fluid pressure in said outlet chamber in a ratio with the metered fluid pressure different than the predetermined ratio.

References Cited by the Examiner

UNITED STATES PATENTS

| | | | |
|---|---|---|---|
| 2,248,437 | 7/1941 | Robinson | 303—7 |
| 2,858,840 | 11/1958 | Wright | 303—40 |
| 3,115,371 | 12/1963 | Valentine. | |
| 3,190,700 | 6/1965 | Fites | 303—48 |

EUGENE G. BOTZ, *Primary Examiner.*